No. 765,614. PATENTED JULY 19, 1904.
J. S. DOYLE.
CONVERTIBLE SEAT.
APPLICATION FILED JAN. 31, 1903.
NO MODEL. 2 SHEETS—SHEET 1.

WITNESSES:
Rob't L. Chapman
Helen Orford

INVENTOR
James S. Doyle,
by Albert H. Davis
Atty.

No. 765,614. PATENTED JULY 19, 1904.
J. S. DOYLE.
CONVERTIBLE SEAT.
APPLICATION FILED JAN. 31, 1903.
NO MODEL. 2 SHEETS—SHEET 2.
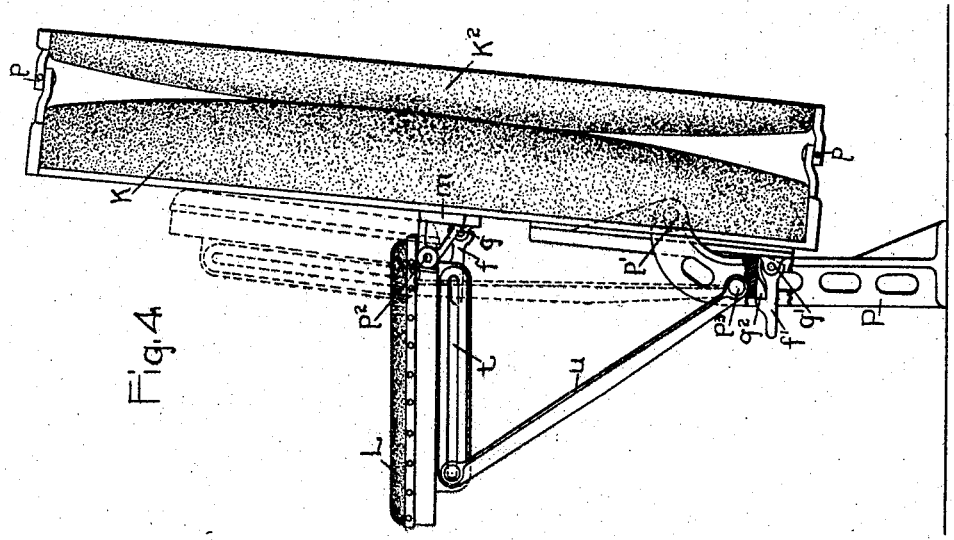
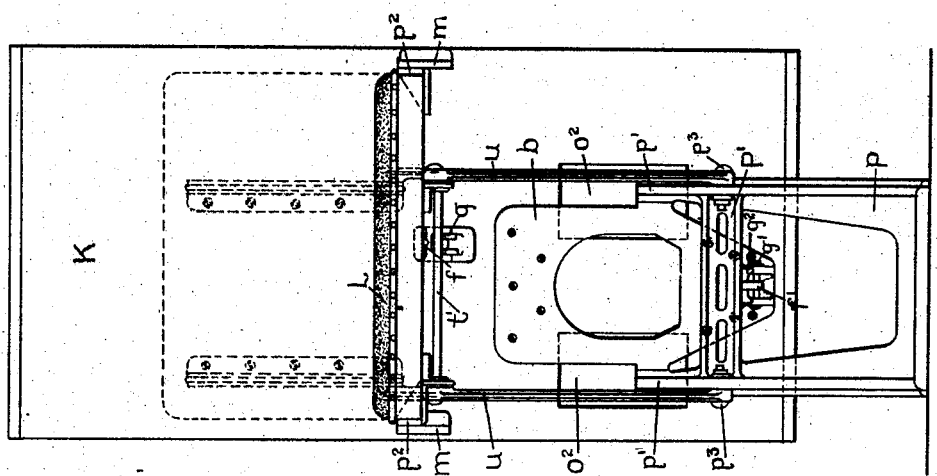
WITNESSES:
INVENTOR:
James S. Doyle.
by Albert H. Davis
Att'y.

No. 765,614. Patented July 19, 1904.

UNITED STATES PATENT OFFICE.

JAMES S. DOYLE, OF NEW YORK, N. Y.

CONVERTIBLE SEAT.

SPECIFICATION forming part of Letters Patent No. 765,614, dated July 19, 1904.

Original application filed September 24, 1902, Serial No. 124,621. Divided and this application filed January 31, 1903. Serial No. 141,223. (No model.)

*To all whom it may concern:*

Be it known that I, JAMES S. DOYLE, a citizen of the United States, residing at New York, county of New York, State of New York, have invented certain new and useful Improvements in Convertible Seats, of which the following is a specification.

My invention relates to improvements in the construction of convertible seats especially applicable for use in railway-cars.

In railway-work, and especially in the operation of electric railways using motor-cars in which the cab for containing the controlling apparatus is located within the car, it is often desirable to utilize the space occupied by the motorman when the controlling apparatus is in use for the purpose of containing a seat or seats for passengers when the controlling apparatus is not in use. It is also sometimes desirable to provide a seat within the motorman's cab for use by the motorman.

The object of my invention is to provide an efficient convertible passengers' and motorman's seat especially adapted for use with the convertible cab shown and described in my application, Serial No. 124,621, filed September 24, 1902, of which this application is a division.

My invention consists of a car-seat having an auxiliary seat fastened to its under side in such a manner that the auxiliary seat may be used when the car-seat is in an inoperative position.

More specifically stated, my invention consists of a pivoted convertible passengers' seat adapted to occupy the space previously occupied by the motorman's cab when the controlling apparatus adjacent to which it is placed on the car is not in use by the motorman, the said seat being constructed and arranged to be turned back out of the way and support a seat for the motorman when the controlling apparatus is in use by the motorman.

Figure 1:
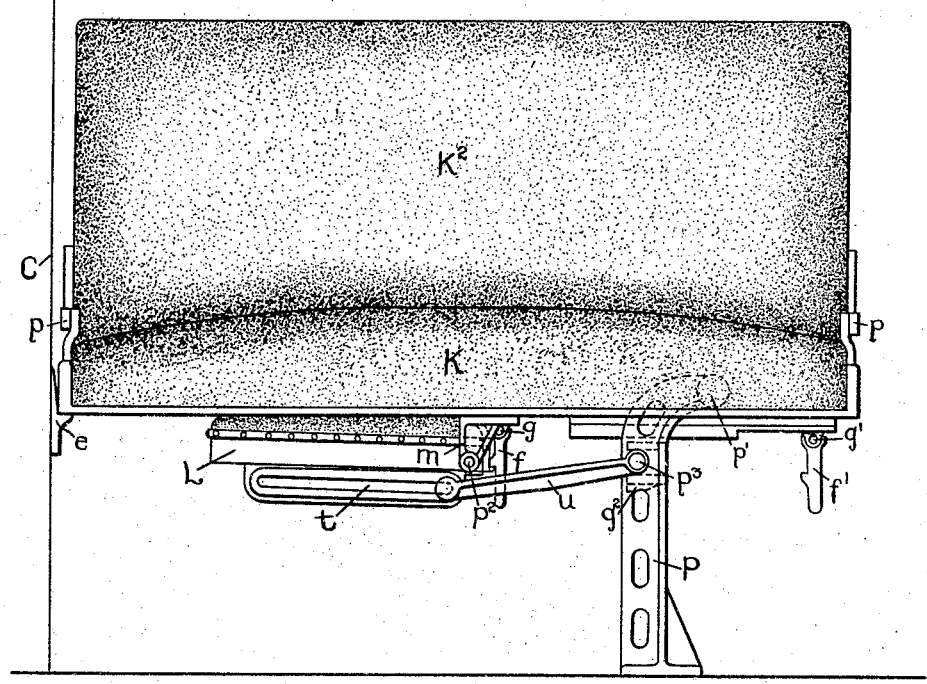
Figure 2:
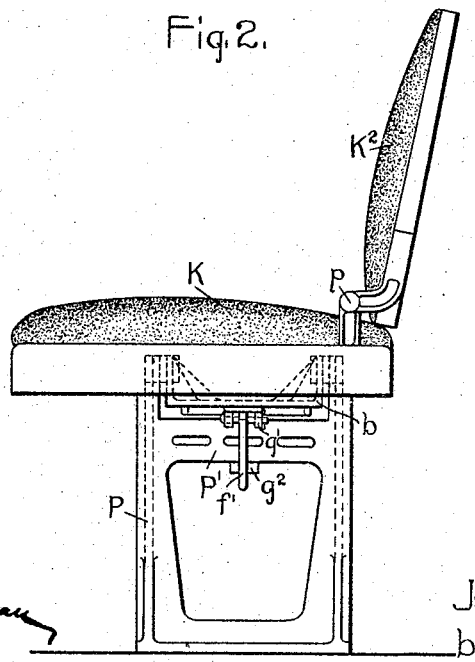

In the accompanying drawings, Figures 1 and 2 are front and end elevations, respectively, of the combined passengers' and motorman's seat, showing the seat in its position for use by passengers; and Figs. 3 and 4 are side and front elevations, respectively, of the said combined or convertible seat, showing the passengers' seat in its inoperative position and the motorman's seat in position for use by the motorman.

Referring now to the figures of the drawings, which show the convertible motorman's and passengers' seat in the various operative positions, K represents the passengers' seat, and $K^2$ represents the back of said seat, which is pivoted to the passengers' seat K at $p$ $p$ and is adapted to be folded parallel to the seat, as shown in Fig. 4. The seat K is pivoted at one end to the supporting-frame P at $p'$. The other end of said seat is supported by lugs $e$, which may be fastened to a movable partition or to a fixed wall or framework. The combined passengers' and motorman's seat may, however, have its free end supported in any other desired manner. Pivoted at $p^2$ to a bracket $m$, which is fastened to the under side of the passengers' seat K, is a motorman's seat L, which is held in the position shown in Fig. 1 by means of a spring-pressed catch $f$ at the time the passengers' seat is in its operative position. The catch $f$ is pivoted to the under side of the passengers' seat at $g$.

When the back $K^2$ of the passengers' seat is turned down on the pivots $p$ $p$ parallel to the seat K and the said seat K is moved into the position shown in Figs. 3 and 4, the motorman's seat L may be moved readily into its operative position by releasing the catch $f$, thereby allowing the rod $t'$, carried by the upper ends of the braces $u$, to slide along the slotted ways $t$ until it comes to rest at the outer ends of said ways. The braces $u$ are pivoted to the supporting-frame P at $p^3$ $p^3$.

P' represents a cross-brace for the supporting-frame P. The plate $b$, which is fastened to the under side of the seat K, carries the supporting-pivots $p'$, which operate in the supporting-frame P. The upper part of the supporting-frame P is curved, and the pivots $p'$ are located in the recesses $o^2$ in the under side of the seat K for the purpose of allowing a more compact arrangement of the parts when the seat is turned in the position shown in Figs. 3 and 4. A spring-pressed catch $f'$, which is pivoted at $g'$ to the under side of the passengers' seat, at one end thereof, is adapted to engage the lug $g^2$, carried by the supporting-brace P', when the seat K is moved into its vertical position and serves to hold the seat in said position, as shown in Figs. 3 and 4.

I have herein shown and described my preferred construction of the convertible seat; but I do not intend to be limited to the specific device herein shown, as many modifications may be made without departing from the spirit and scope of my invention. Neither do I intend to limit the application of said convertible seat to railway-cars, since it is equally applicable to a variety of other uses.

What I claim as new, and desire to secure by Letters Patent of the United States, is—

1. In an electric car, a passengers' seat having a vertical inoperative position and a horizontal operative position, means for supporting said seat in a position for use by passengers, means for supporting said seat in its vertical position, an auxiliary seat attached to said passengers' seat, and means for supporting said auxiliary seat in a position for use by the motorman when said passengers' seat is in its vertical position.

2. A car-seat, a supporting-frame on which said seat is pivotally mounted so as to be moved into an inoperative position, and an auxiliary seat fastened to the under side of said car-seat and supported thereby so that it is adapted for use when the car-seat is in its inoperative position.

3. A car-seat having a horizontal operative position and a vertical inoperative position, and a supporting-frame for said seat, in combination with an auxiliary seat fastened to the under side of said car-seat so that it may be used when the car-seat is in its vertical inoperative position.

4. A car-seat, and a supporting-frame therefor, said seat being adapted to be moved from a horizontal to a vertical position, in combination with an auxiliary seat operatively connected with said car-seat, means for holding said auxiliary seat in a position parallel to said car-seat when the latter is in its horizontal position, and means for holding said auxiliary seat in a position at right angles to the said car-seat when the car-seat is in its vertical position.

5. A pivoted seat, and means for supporting said seat in a horizontal or a vertical position, in combination with an auxiliary seat operatively connected to said pivoted seat and adapted for use when the pivoted seat is in its vertical position.

6. A car-seat having a horizontal operative position and a vertical inoperative position, a supporting-frame for said seat, and means for holding said seat in its inoperative position after it has been moved into said last-mentioned position, in combination with an auxiliary seat operatively connected with said car-seat, and means whereby said auxiliary seat may be supported in an operative position when said car-seat is moved into its inoperative position.

7. A car-seat, a supporting-frame on which one end of said seat is pivoted, means for supporting the other end of said seat when in its position for use by passengers, and means for holding said seat in a vertical inoperative position, in combination with an auxiliary seat fastened to the under side of said car-seat and rendered operative when said car-seat is in its vertical inoperative position.

8. A car-seat, a supporting-frame on which said seat is pivoted, a back for said seat pivoted so as to be turned into a position parallel to the said car-seat, said seat and back being adapted to be turned into a vertical inoperative position, and an auxiliary seat carried by said car-seat which is rendered normally inoperative when the car-seat is in its horizontal position but is adapted for use when said car-seat is in its inoperative vertical position.

In witness whereof I have hereunto set my hand this 26th day of January, 1903.

JAMES S. DOYLE.

Witnesses:
 JOHN GEORGE BUCHLER,
 G. W. SMITH.